United States Patent Office 3,008,920
Patented Nov. 14, 1961

3,008,920
METHOD OF INHIBITING HOMOPOLYMERIZATION IN GRAFT COPOLYMERS WITH COPPER SALTS
Demetrius Urchick, Midland, Mich., assignor to The Dow Chemical Company, Midland, Mich., a corporation of Delaware
No Drawing. Filed Apr. 27, 1959, Ser. No. 808,872
4 Claims. (Cl. 260—45.5)

This invention concerns a method and agents for inhibiting the formation of homopolymer in the manufacture of graft copolymers.

A graf copolymer as is well understood in the art is produced by "grafting" branches of a monomer capable of addition polymerization onto a pre-formed polymer chain or backbone.

It has been proposed that graft copolymers can be prepared by placing the free radical source on the backbone polymer and then generating free radicals from the polymer in the presence of a monomer capable of being polymerized by a free radical mechanism. It has also been suggested to prepare graft copolymers by subjecting a polymer to high energy ionizing radiation, suitably in air or an oxygen containing atmosphere, to generate active sites or centers, or free radical sources on the polymer molecules and then contact the polymer with a monomer capable of being polymerized by a free radical mechanism to form an addition polymer. Among the difficulties of preparing graft copolymers is that there is a great deal of homopolymer formed along with the graft copolymer. The homopolymer frequently is insoluble or difficult to separate from the graft copolymer product and is undesired.

It is a primary object of the invention to provide a method and agents for inhibiting or substantially preventing the formation of homopolymer in the manufacture of graft copolymers. Another object is to provide a method for making graft copolymers wherein a major portion of the monomers consumed in the reaction are converted to graft copolymer. Other and related objects may appear from the following description of the invention.

According to the invention a method of inhibiting or substantially preventing the formation of homopolymer in the manufacture of graft copolymers by grafting side chains from free-radical-polymerizing monomers onto another preformed polymer chain has been devised, which method consists in carrying out of the graft copolymerizing reaction in the presence of a small but effective amount of a mixture of basic cupric oxychloride of the formula $CuCl_2 \cdot 3Cu(OH)_2$ and cuprous oxide, $Cu_2O$,, e.g. an amount corresponding to from 30 to 65 parts by weight of each of said compounds per million parts by weight of the monomer initially used. The basic cupric oxychloride and the cuprous oxide are preferably employed in proportions to one another of equal parts by weight.

The polymer to be employed in the process can be any natural or synthetic organic addition or condensation polymer having at least 20 monomer units chemically combined in the polymer molecule and having active centers or free radical sources along the polymer chain or molecule. Examples of suitable polymers are wool, cotton, nylon, polyethylene terphthalate, polystyrene, polyethylene, polypropylene, polyvinyl chloride, saran, polymethyl methacrylate, copolymers of styrene and acrylonitrile, copolymers of styrene and methyl methacrylate, copolymers of styrene and natural or a synthetic rubber, copolymers of vinyl chloride and vinyl acetate, and the like. The nature of the starting polymer is not critical it being only required that the polymer have active centers or free radical sources along the polymer chain which are capable of acting as free radical initiators in the polymerization of vinylidene compounds to produce the graft copolymers.

The active centers or free radical sources in the starting polymer chains or molecules can be effected in known ways such as by subjecting the polymer to high energy ionizing radiation, e.g. to high speed electrons, gamma rays or X-rays by oxidation of the polymer in the presence of a peroxide or hydroperoxide or by treating the polymer with a gaseous atmosphere containing ozone.

The graft copolymers are prepared by contacting the polymer containing the free radical sources with a monomer capable of addition polymerization, preferably in the absence or substantial absence of air or oxygen and in liquid form or a liquid solvent for the monomer, containing in accordance with the invention a small amount, suitably from 30 to 65 parts by weight, of basic cupric oxychloride of the formula $CuCl_2 \cdot 3Cu(OH)_2$ and from 30 to 65 parts by weight of cuprous oxide, per million parts by weight of the monomer initially used.

The monomers to be employed in the process can be any ethylenically unsaturated vinylidene compound capable of free-radical-polymerizing to form an addition polymer. Among suitable monomers are acrylonitrile, acrylamide, vinyl chloride, vinyl acetate, ethyl acrylate, butyl acrylate, methyl methacrylate, butyl methacrylate, 2-ethylhexyl acrylate, ethyl vinyl ether, butyl vinyl ether, methyl isopropenyl ketone, chlorotrifluoroethylene, vinylidene chloride, styrene, vinyltoluene, vinylxylene, isopropyl styrene, dichlorostyrene, tert.-butyl styrene, butadiene, isoprene, ethylene glycol dimethacrylate, vinyl pyrrolidone and the like.

In practice, the polymer containing free radical sources along the polymer chains or molecules, e.g. polyethylene which has been subjected to high energy ionizing radiation such as electrons from a Van de Graaff generator or gamma rays from cobalt 60 in a field having an intensity of at least 40,000 rads per hour for a total dose of from 0.1 to 20 megarads, or polyethylene which has been treated with a gaseous atmosphere containing from 0.5 to 6 percent by volume of ozone for a time of from 0.5 to 4 hours or longer, or polyisopropylstyrene which has been oxidized until it contains an appreciable amount of polyisopropylstyrene hydroperoxide, is brought into contact with the vinylidene monomer, suitably by immersing or suspending the polymer in the monomer or a mixture of the monomer and a solvent therefor, which may swell but not dissolve the polymer, and containing the basic cupric oxychloride of the formula $CuCl_2 \cdot 3(OH)_2$ and the cuprous oxide in the desired proportions.

The grafting reaction is usually carried out at temperatures between about 0° and 150° C. and at atmospheric subatmospheric or superatmospheric pressures such that the monomer is in a liquid condition.

The following examples illustrate ways in which the principle of the invention has been applied, but are not to be construed as limiting the invention.

*Example 1*

A film 2 mils thick, prepared from high pressure polyethylene having a melt index of 2 as determined by procedure described in ASTM D1238–57T, was contacted with a gaseous atmosphere of 6 percent by volume of ozone and 94 percent by volume of oxygen at room temperature and atmospheric pressure for a period of one hour. Test pieces approximately one inch square were cut from the ozonized polyethylene film and were weighed. A test piece of the ozonized film weighing 0.0230 gm. was placed in a glass ampoule under an atmosphere of nitrogen gas, together with 20 ml. of acrylonitrile and 50 parts by weight of basic cupric oxychloride of the formula $CuCl_2 \cdot 3Cu(OH)_2$ and 50 parts by weight of cuprous oxide ($Cu_2O$) per million parts by weight of the acrylonitrile. The ampoule was cooled in a Dry Ice bath and sealed. After warming to room temperature the ampoule was placed in an oil bath and heated at a temperature of 120° C. for a period of 2 hours, then was removed and cooled. The ampoule was broken and the polyethylene film removed. It was dried and weighed. The graft copolymer film weighed 0.1060 gm. The increase in weight of 0.0830 gm. represents the amount of acrylonitrile graft-copolymerized onto the polyethylene. The homopolymer formed in the reaction was recovered. It weighed 0.0223 gm. The proportion of acrylonitrile that formed graft copolymer was 78.8 percent based on the acrylonitrile consumed in the reaction, and correspondingly only 21.2 percent of the acrylonitrile consumed in the reaction formed homopolymer. The graft copolymer film was clear and transparent. It consisted of 78 percent by weight of acrylonitrile and 22 percent polyethylene.

In a similar experiment, wherein the polymerization was carried out in the absence of the basic cupric oxychloride and the cuprous oxide, under otherwise similar reaction conditions, only 23.8 percent of the acrylonitrile consumed in the reaction polymerized to form graft copolymer, whereas 76.2 percent of the consumed acrylonitrile formed homopolymer.

Example 2

When a graft copolymer of acrylonitrile on an ozonized polyethylene film is prepared by polymerizing the monomer in the presence of 30 parts by weight of the basic cupric oxychloride and 30 parts by weight of the cuprous oxide per million parts by weight of the acrylonitrile initially used, or in the presence of 65 parts by weight of the basic cupric oxychloride and 65 parts by weight of the cuprous oxide, the proportion of the acrylonitrile consumed in the reaction which forms graft copolymer is found to be about 55 percent, and correspondingly about 45 percent of the consumed acrylonitrile forms homopolymer. Greater or lesser proportions of the cupric oxychloride and the cuprous oxide are less effective for inhibiting the formation of homopolymer under otherwise similar conditions.

Inhibiting of the formation of homopolymer is obtained when other monoethylenically unsaturated monomers capable of polymerizing by free radicals to form addition polymers such as ethyl acrylate, butyl acrylate, 2-ethylhexyl acrylate, methyl methacrylate, butyl methacrylate, styrene, dichlorostyrene, vinyl acetate, vinyl chloride, vinylidene chloride, chlorotrifluoroethylene and the like are substituted for the acrylonitrile employed in the example. Also, similar results are obtained when other addition polymers such as polystyrene, polyvinyltoluene, polypropylene, polymethyl methacrylate, copolymers of styrene and acrylonitrile, copolymers of styrene and methyl methacrylate, copolymers of styrene and from 2 to 15 percent by weight of natural or a synthetic rubber, which polymers contain active sites along the polymer molecule chains capable of acting as free radical initiators such as active sites produced by irradiation of the polymer by high energy ionizing radiation or by oxidation or ozonization of the polymer, are substituted for the ozonized polyethylene employed in the example.

I claim:

1. In a process for making a graft copolymer which comprises polymerizing a polymerizable ethylenically unsaturated monomer in the presence of an organic polymer containing at least 20 monomer units, which polymer contains active sites along the polymer chains as the only free radical initiator present in the polymerization mixture, the improvement which consists in carrying out the grafting copolymerization in the presence of a mixture of each of the compounds basic cupric oxychloride of the formula $CuCl_2 \cdot 3Cu(OH)_2$ and cuprous oxide ($Cu_2O$) in the small but effective amounts sufficient to appreciably inhibit the formation of homopolymer of the monomer.

2. In a process for making a graft copolymer which comprises polymerizing a polymerizable monoethylenically unsaturated vinylidene monomer in the presence of polyethylene containing active sites along the polymer chains as the only free radical initator in the polymerization mixture, the improvement which consists in carrying out the grafting copolymerization in the presence of a mixture of each of the compounds basic cupric oxychloride of the formula $CuCl_2 \cdot 3Cu(OH)_2$ and cuprous oxide ($Cu_2O$) in the small but effective amounts sufficient to appreciably inhibit the formation of homopolymer of the monomer.

3. A process according to claim 2, wherein the polyethylene contains ozonide sites along the polymer chains as the only free radical initiator in the polymerization mixture.

4. A process according to claim 3, wherein the monomer is acrylonitrile.

References Cited in the file of this patent
UNITED STATES PATENTS
2,837,496    Vandenberg _____ June 3, 1958